Patented Nov. 26, 1929

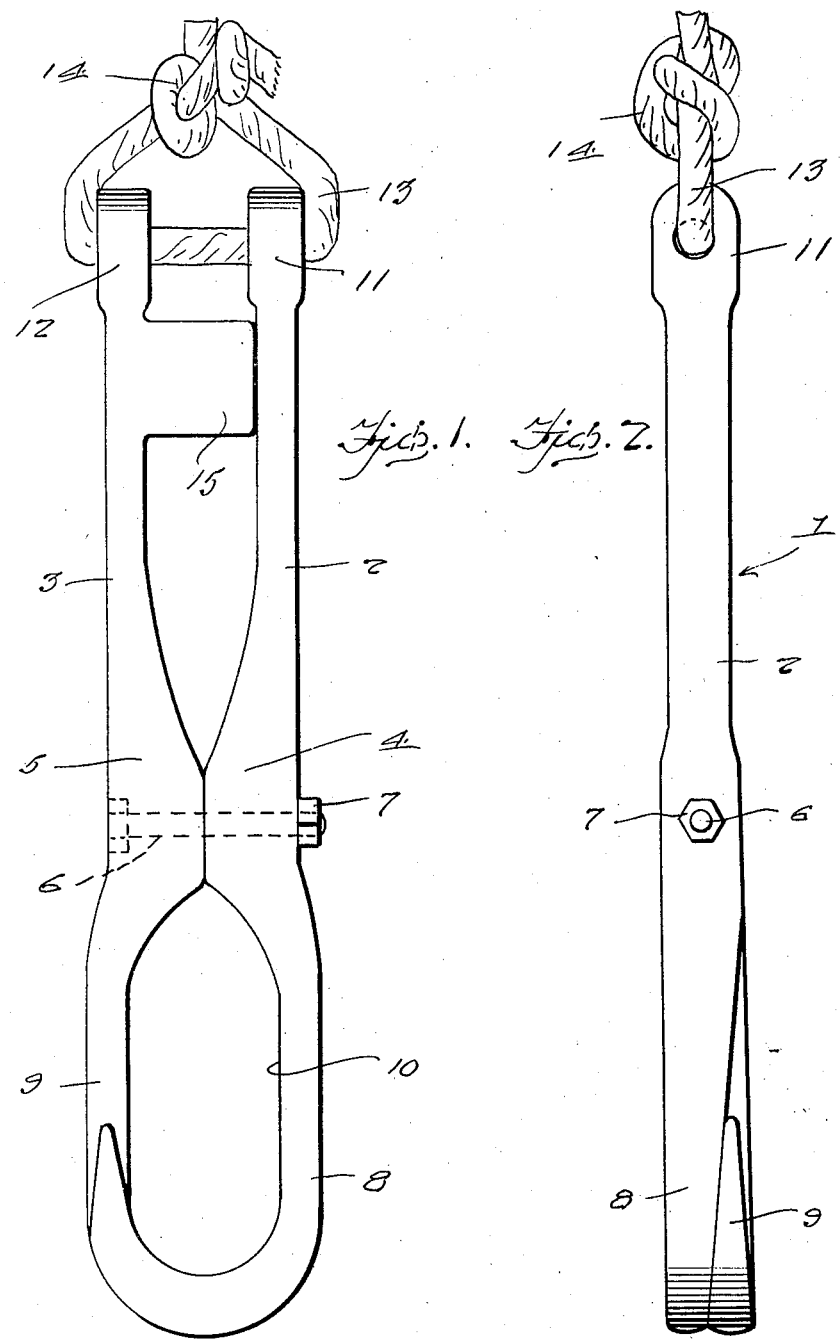

1,737,058

UNITED STATES PATENT OFFICE

JOHN H. PIXLEY, OF LANSING, MICHIGAN, ASSIGNOR OF ONE-HALF TO ALBERT DRALL, OF LANSING, MICHIGAN

HITCH

Application filed May 7, 1928. Serial No. 275,623.

The present invention relates to improvements in draft appliances, and has reference more particularly to a hitch for coupling two vehicles together whenever necessary.

One of the important objects of the present invention is to provide a hitch that can be readily and easily actuated for opening the same, one end of the hitch being adapted for attachment with a part of the towing vehicle, while the other end is adapted for attachment to a tow rope attached to the vehicle to be pulled.

A further object is to provide a hitch that is particularly adapted to be used for towing purposes, the same being simple in construction, inexpensive, strong and durable and further well adapted to the purpose for which it is designed.

Other objects of the invention will become apparent as the nature of the invention proceeds and when taken in connection with the accompanying drawing.

In the accompanying drawings:

Figure 1 is a side elevation of the hitch embodying my invention, and

Figure 2 is an edge elevation thereof.

In the drawing, wherein for the purpose of illustration is shown the preferred embodiment of my invention, the numeral 1 designates generally my improved hitch, the same comprising a pair of elongated levers designated by the numerals 2 and 3 respectively and these levers are disposed in parallel spaced relation.

An enlargement is formed on the inner face of each lever at the intermediate portion thereof as shown at 4 and 5 respectively and the adjacent faces of the enlargements are disposed in abutting relation. A bolt 6 extends transversely through the enlarged portions of the levers and a nut 7 is threaded on the outer end of the bolt. This construction provides a pivotal connection between the levers at the intermediate portions thereof.

Each lever is formed at one end with a hook the hook formed on the end of the lever 2 being designated by the numeral 8, while the hook on the end of the other lever is indicated at 9. These hooks are disposed in opposite directions and furthermore, said hooks decrease gradually in thickness toward their free ends and also it will be observed that the bill portions of the opposed hooks are arranged in overlapping relation so that when the levers are in true alignment with each other, the opposed hooks will be in a closed position to form what may be termed a link 10 to enclose the axle housing or other desirable part of the towing vehicle.

The other end of each lever is formed with a transversely disposed apertured ear, the ear associated with the lever 2 being designated by the numeral 11, while the ear that is formed on the end of the lever 3 is designated by the numeral 12.

A towing rope 13 that is attached at one end to the vehicle to be towed, (not shown) has its other end disposed through the apertured ears 11 and 12 and is tied to the intermediate portion of the rope as shown at 14. The hitch 1 therefore provides a means for connecting the forward end of the tow rope to the towing vehicle and furthermore when the rope extends through the apertured ears, the cooperating hooks cannot be opened as is readily obvious from the construction shown. For the purpose of limiting the inward swinging movement of the levers 2 and 3, with respect to each other, there is formed on the inner side face of the lever 3, a stop lug or block 15, that engages with the inner side face of the adjacent portion of the lever 2, as clearly shown in Figure 1. By untying the knot 14 and removing the forward end portion of the rope 13 from the apertured ears, said levers 2 and 3 may then be swung on the pivot 6, in opposite directions in order to separate the opposed hooks, whereby to disengage the hitch from the towing vehicle.

The simplicity of my device enables the same to be readily and easily operated, and furthermore will be operated at a very low cost and will, at all times, be positive and efficient in carrying out the purposes for which it is designed.

While I have shown the preferred embodiment of my invention, it is to be understood that various changes in the size, shape and arrangement of parts may be resorted to, without departing from the spirit of the invention or the scope of the appended claim.

Having thus described my invention, what I claim as new is:

In a hitch for attachment at one end to a tow rope, a pair of spaced levers, enlargements formed on the inner opposed faces of the levers at the intermediate portions thereof, a pivot forming bolt extending transversely through the enlarged portions of the levers, oppositely disposed hooks formed on the pivoted ends of the levers, the bills of the hooks being disposed in overlapping relation, apertured ears formed on the other ends of the levers through which one end of a tow rope is disposed, the hooks being maintained in a closed position when the tow rope is secured through the apertured ears, and a stop lug formed on the inner face of one lever adjacent the opposite ear thereof for engagement with the inner face of the adjacent portion of the complementary lever, to limit the inward swinging movement of the levers toward each other.

In testimony whereof I affix my signature.

JOHN H. PIXLEY.